(12) United States Patent
Litz et al.

(10) Patent No.: US 11,358,440 B2
(45) Date of Patent: Jun. 14, 2022

(54) HEATING SYSTEM FOR A VEHICLE WINDSHIELD

(71) Applicant: Ford Global Technologies, LLC, Dearborn, MI (US)

(72) Inventors: Armin Litz, Cologne (DE); Matus Banyay, Frechen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 16/674,226

(22) Filed: Nov. 5, 2019

(65) Prior Publication Data

US 2020/0148037 A1 May 14, 2020

(30) Foreign Application Priority Data

Nov. 12, 2018 (DE) .......................... 102018219299.5

(51) Int. Cl.
*B60J 1/02* (2006.01)
*B60S 1/54* (2006.01)
*B60H 1/00* (2006.01)
*B60H 1/26* (2006.01)

(52) U.S. Cl.
CPC .......... *B60H 1/267* (2013.01); *B60H 1/00521* (2013.01); *B60J 1/02* (2013.01); *B60S 1/544* (2013.01)

(58) Field of Classification Search
CPC ........ B60H 1/267; B60H 1/00521; B60J 1/02; B60S 1/544

USPC ........................................................ 454/143
See application file for complete search history.

(56) References Cited

U.S. PATENT DOCUMENTS

| | | | | |
|---|---|---|---|---|
| 2,389,704 A * | 11/1945 | Villani | ...................... | B60S 1/54 454/122 |
| 2,659,942 A * | 11/1953 | Iverson | ...................... | B60S 1/54 454/127 |
| 3,915,548 A * | 10/1975 | Opittek | ............... | G02B 27/0103 348/790 |
| 5,957,770 A * | 9/1999 | Boyer | .................... | B60H 1/242 454/85 |
| 6,394,890 B1 | 5/2002 | Merkel | | |
| 6,431,267 B1 * | 8/2002 | Tanaka | ............... | B60H 1/00064 165/204 |
| 7,322,632 B1 * | 1/2008 | Marszalek | ................. | B60J 3/02 296/97.7 |
| 2008/0129073 A1 * | 6/2008 | Nishikawa | .......... | G02B 27/0101 296/84.1 |

* cited by examiner

*Primary Examiner* — Allen R. B. Schult
(74) *Attorney, Agent, or Firm* — Vichit Chea; Price Heneveld LLP

(57) ABSTRACT

A heating system for a windshield of a vehicle, in which a fan unit is configured to produce a hot air flow at the inner side of the windshield. In order to enable efficient heating of a windshield of an electric vehicle, there is provision for the heating system to have an at least predominantly transparent partition unit, which in a shielding position is secured in the vehicle in such a manner that it is arranged in the longitudinal vehicle direction between at least a predominant portion of the windshield and an inner region which is provided for passengers, whereby the hot air flow can be guided at least partially in a heating region between the windshield and the partition unit.

18 Claims, 3 Drawing Sheets

HEATING SYSTEM FOR A VEHICLE WINDSHIELD

FIELD OF THE DISCLOSURE

The present disclosure generally relates to a heating system for a windshield of a vehicle, in which a fan unit is configured to produce a hot air flow at the inner side of the windshield.

BACKGROUND OF THE DISCLOSURE

In battery-operated electric vehicles (also known as BEV, Battery Electric Vehicles), excess heat from the engine for heating purposes is generally not available, as is possible with vehicles having an internal combustion engine. Therefore, a high proportion of the battery power is typically used to heat the vehicle or to defrost the windshield, the side windows and the rear window. At extremely low ambient temperatures, for example, between −10° C. and −35° C., the required heating power may be greater than the required drive power, that is to say, the range of the vehicles may be thereby considerably decreased. Furthermore, with a decreasing ambient temperature, it is increasingly difficult to defrost the windows. If it is further taken into account that the battery capacity typically decreases at low temperatures, the efficiency of battery-operated electric vehicles with respect to heating may be significantly lower than that of vehicles with an internal combustion engine. With an internal combustion engine, it is possible to increase the quantity of waste heat, for example, by increasing the speed either in idle mode or by selecting a lower gear. A reduced heating capacity can, however, also be observed with particularly efficient internal combustion engines so that the vehicles which are provided therewith are also often dependent on supplementary heating devices, such as positive temperature coefficient (PTC) elements, fuel-operated heating systems or thermal pumps in order to heat the inner space or to defrost the windows.

In order to defrost the windshield quickly, a high temperature and a high fan power may be used. The fan is generally arranged below the windshield and blows hot air from below in an upward direction along the windshield. This generally leads to increased temperatures in the region in which the heads of the passengers are normally located. In the head space, however, elevated temperatures above approximately 26° C. may be perceived to be unpleasant, whilst in the foot space considerably higher temperatures can be tolerated. In practice, however, a vertical temperature distribution can often occur, at which the temperature in the head space is higher than in the foot space. However, the draft which is perceived in the head region may also be undesirable.

It would be desirable to provide the efficient heating of a windshield in electric vehicles and other vehicles with a low driving waste heat.

SUMMARY OF THE DISCLOSURE

According to one aspect of the present disclosure, a heating system for a windshield of a vehicle is provided. The heating system for a windshield of a vehicle includes a fan unit configured to produce a hot air flow at an inner side of the windshield, and an at least predominantly transparent partition unit which, in a shielding position, is secured in the vehicle in a manner arranged in a longitudinal vehicle direction between at least a predominant portion of the windshield and an inner region provided for passengers, whereby the hot air flow is guided at least partially in a heating region between the windshield and the partition unit.

According to another aspect of the present disclosure, a heating system for a windshield of a vehicle is provided. The heating system for a windshield of a vehicle includes a fan unit producing a hot air flow at an inner side of the windshield, and a predominantly transparent partition unit which, in a shielding position, is secured in the vehicle between at least a predominant portion of the windshield and an inner region which is provided for passengers, whereby the hot air flow is guided at least partially in a heating region between the windshield and the partition unit.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
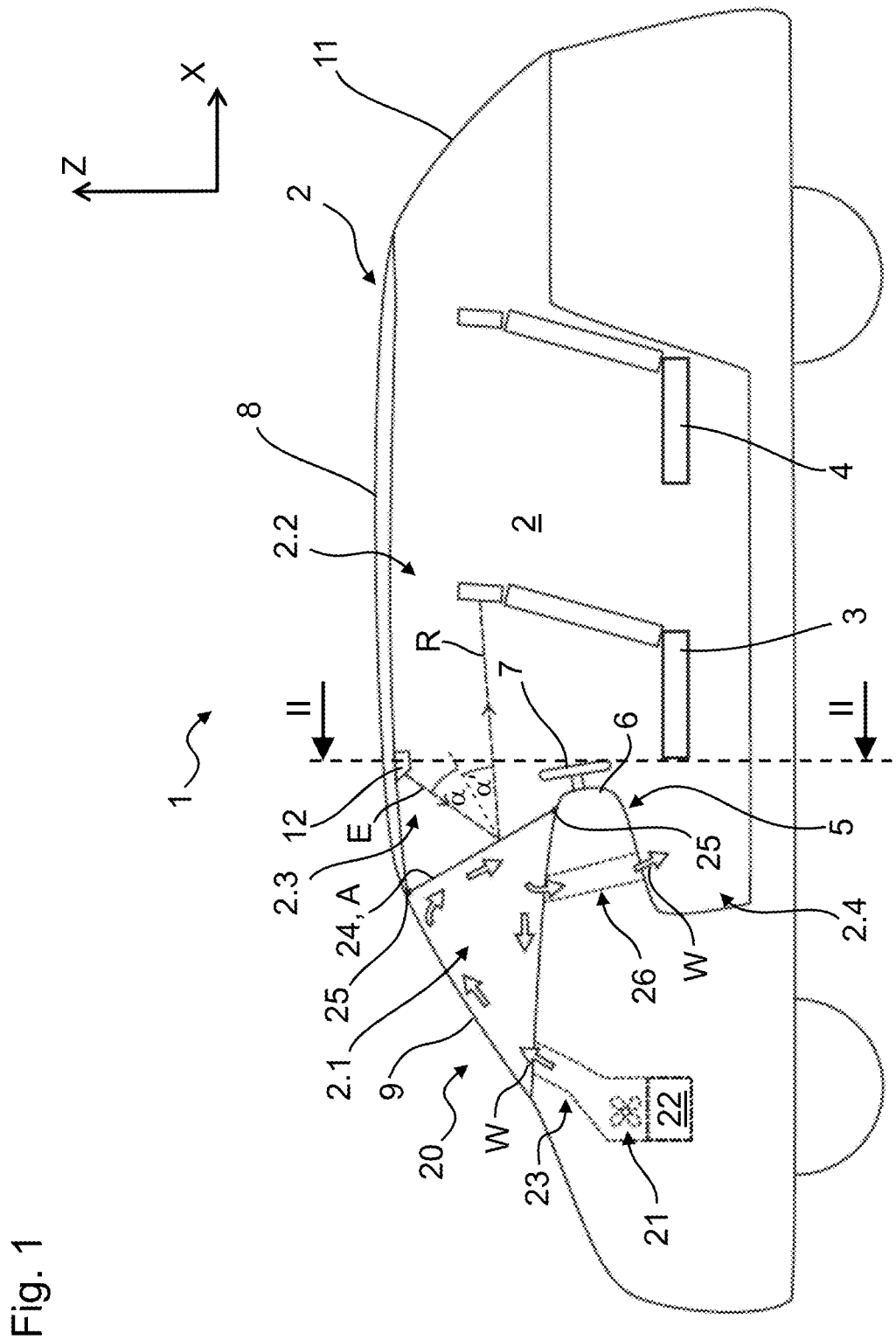
FIG. 1 is a lateral sectioned illustration of a motor vehicle with a first heating system according to one embodiment taken along the line I-I in FIG. 2.

In the different drawing figures, the same components are always given the same reference numerals, for which reason they are generally also only described once.

Figure 2:
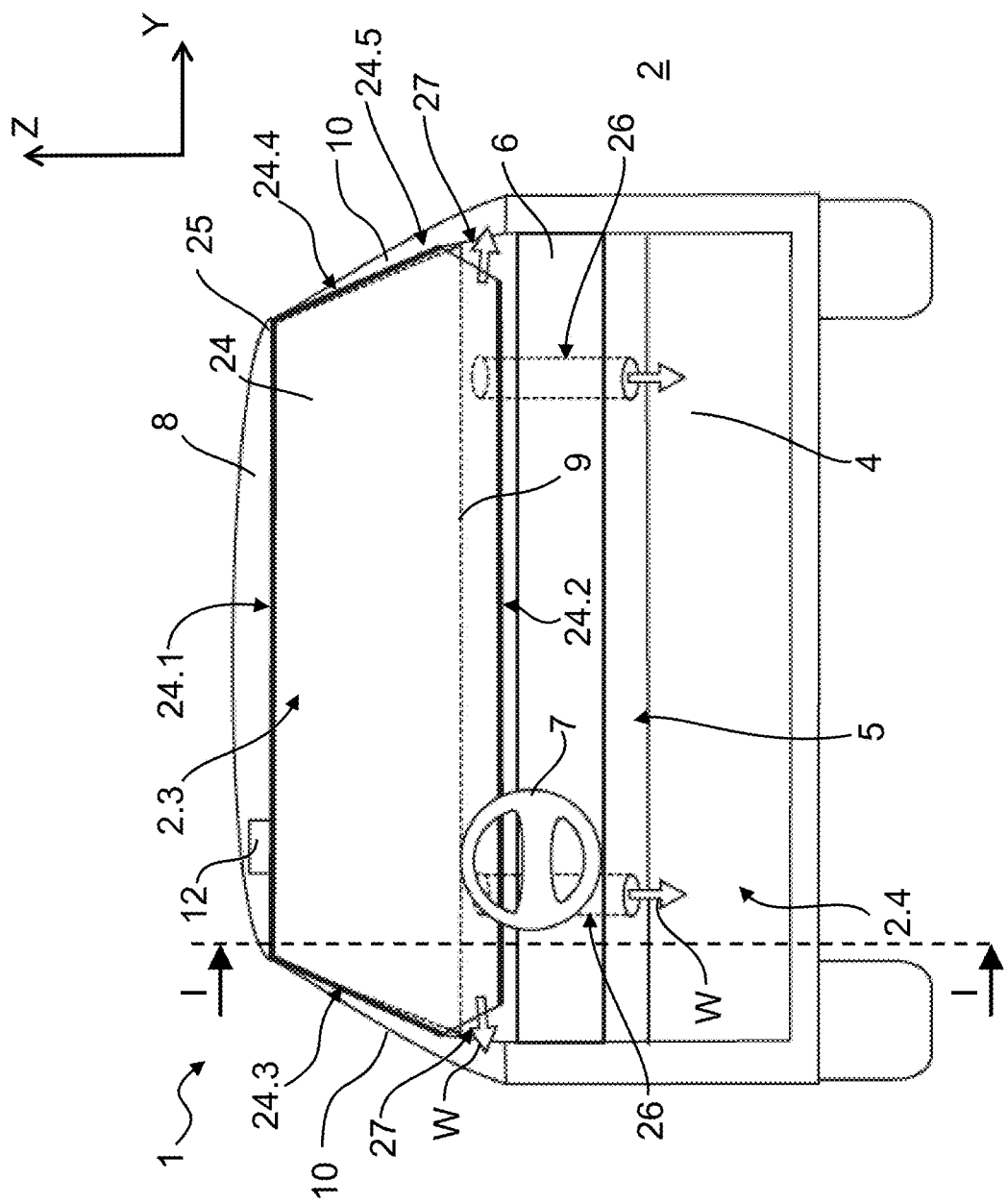
FIG. 2 is a sectioned illustration taken along the line II-II in FIG. 1.

FIG. 1 is a lateral sectioned illustration of a motor vehicle 1, in this example as a passenger vehicle. FIG. 2 is a rear view of the motor vehicle 1, also as a sectioned illustration. The motor vehicle 1 has an inner space 2, in which front seats 3 and a rear bench type seat 4 are arranged. An instrument panel 6 and a steering wheel 7 are arranged on a front console 5. In an upward direction, the inner space 2 is delimited by a vehicle roof 8, toward the front by a windshield 9, also referred to as a windscreen, to the sides by side windows 10 and toward the rear by a rear window 11.

In order to heat the windshield 9 from the inner side, for example, in order to defrost it, a heating system 20 is provided. Below the console 5 there is integrated a fan unit 21 which conveys hot air from a heat source 22. The heat source 22 is in this instance illustrated purely schematically. It could, for example, be an electric heat source if the motor vehicle 1 is constructed as a battery-operated electric vehicle, or also an internal combustion engine, in particular a highly efficient internal combustion engine with a low fuel consumption. The fan unit 21 produces a hot air flow W which is guided through a first channel 23 to the inner side of the windshield 9.

Within the inner space 2 there is additionally arranged a partition unit 24 which is located in a shielding position A. This partition unit 24 is at least predominantly transparent and may, for example, be constructed as a pane of (safety) glass or plastics material. An upper edge 24.1 abuts the vehicle roof 8 and a lower edge 24.2 abuts the front console 5. Lateral edges 24.3, 24.4 may depending on the design, for example, abut an A-pillar (not illustrated) or other adjacent vehicle inner faces. At each of the edges 24.1 to 24.4, the partition unit 24 has a resilient seal 25 (for example, of sponge rubber) which ensures an at least substantially airtight connection and furthermore via a non-positive-locking connection stabilizes the partition unit 24 in the inner space 2. There may additionally be provided in this instance one or more securing mechanisms which are not illustrated for the partition unit 24. These are preferably constructed so as to be releasable, where applicable also releasable without tools. The partition unit 24 can thereby be removed from the shielding position A, for example, in order to clean the partition unit 24 or the windshield 9.

In the shielding position illustrated in FIGS. 1 and 2, the partition unit 24 sub-divides the inner space 2 into a heating region 2.1 which is formed between it and the windshield 9 and an inner region 2.2 which is located therebehind along the X axis and in which the seats 3 and the rear bench type seat 4 are arranged. The partition unit 24 is in this instance arranged with respect to the X axis between practically the entire windshield 9 and the inner region 2.2. Consequently, the hot air flow W which flows along the inner side of the windshield 9 cannot readily reach the inner region 2.2, but instead is redirected by the partition unit 24 and remains initially inside the heating region 2.1. It could also be said that it is guided inside the heating region 2.1. On the one hand, it is thereby possible for the hot air flow W not to be prematurely mixed with cooler air from the inner region 2.2. Consequently, a higher temperature in the heating region 2.1 adjacent to the windshield 9 can be achieved, which leads to a more efficient heating thereof. On the other hand, the hot air flow W is prevented from flowing into an upper region 2.3, which could be perceived to be unpleasant by the passengers. That is to say, the temperature in the head region 2.3 can be kept to a lower level.

Since hot air is continuously conveyed into the heating region 2.1 by the fan unit 21, the hot air also has to be discharged from the heating region 2.1 in another manner. This may be carried out, on the one hand, through second air channels 26 which are arranged behind or inside the console 5 and which connect the heating region 2.1 to a foot space 2.4. As a result of the fact that at least a portion of the hot air flow W is directed into the foot space 2.4, the temperature in the foot space 2.4 is increased and a temperature layering may be realized in which the temperature in the foot space 2.4 is higher than in the head region 2.3. Furthermore, along the Y axis at both sides at the edge side of the partition unit 24, two ventilation openings 27 are formed. These ventilation openings 27 are formed between the partition unit 24 and an adjacent vehicle inner face, as a result of the outer contour of the partition unit 24 being recessed with respect to the opposing inner contour in this region. Through the ventilation openings 27, a portion of the hot air flow W is directed to the side windows 10 in order to protect the side windows, for example, from misting or to defrost them. The ventilation openings 27 are limited to a lower region 24.5 of the partition unit 24 in order to prevent hot air from flowing into the upper region 2.3. In some embodiments, depending on requirements, either the second air channels 26 or the ventilation openings 27 could be dispensed with.

In the embodiment shown, the partition unit 24, more specifically a portion thereof, is further used as a projection face for an HUD unit 12, which is arranged on the vehicle roof 8. For example, there is shown an incident beam E which is emitted from the HUD unit 12 and which strikes the partition unit 24 at an angle of incidence ', and a reflected beam R which is reflected at an angle of reflection α' in such a manner that it can be perceived by the driver. It is thereby possible to introduce extremely varied information directly into the field of vision of the driver. In addition, it is also conceivable for a user to be able to input control commands by touching the surface of the partition unit 24. In this instance, the position of a finger on the partition unit 24 could be determined, for example, by use of optical sensors. Of course, other types of sensors are also possible. In the present example, the partition unit 24 is inclined with the upper edge 24.1 thereof away from the driver, resulting again in the HUD unit 12 needing to be fitted above the partition unit 24 on the vehicle roof 8. Alternatively, the partition unit 24 could also be inclined with the upper edge 24.1 thereof in the direction toward the driver and, for example, at a slight angle or even partially parallel with respect to the windshield 9. In this instance, the HUD unit 12 would have to be arranged in an appropriate manner in the region of the console 5.

In the embodiment illustrated in this instance, the partition unit 24 is constructed as a flat plate with parallel boundaries. However, different modifications would be conceivable. The partition unit 24 as a whole or at least the inner boundary thereof could thus, for example, be constructed to be curved. The shape may be spherical or non-spherical. Both a convex and a concave curvature are conceivable. In this instance, the curvature may also be non-constant, that is to say, individual regions may be curved to different extents or individual regions may be curved in a convex manner and others in a concave manner. Furthermore, individual regions may be constructed in a planar manner. As a result of the curvature of the partition unit 24, the imaging behavior of the HUD unit 12 can be influenced. That is to say, the partition unit 24 cooperates as an additional optical imaging element with the HUD unit 12. The internal optics of the HUD unit 12 can thereby where applicable be constructed in a simpler manner or even projections which cannot be achieved by the internal optics of the HUD unit 12 in combination with a planar partition unit 24 are possible.

Additionally or alternatively to the curvature mentioned, the two boundaries of the partition unit 24 may at least in the region of the projection face extend at an angle relative to each other, that is to say, in a non-parallel manner. It is thereby possible to prevent the occurrence of noticeable dual images which are generally produced when a plane with parallel boundaries is used for the projection. Alternatively, a boundary (normally the inner boundary) may have a film or other type of coating which has highly reflective properties or which reflects the selectively polarized light. The latter may advantageously be combined together with a HUD unit 12 which accordingly emits polarized light.

Figure 3:
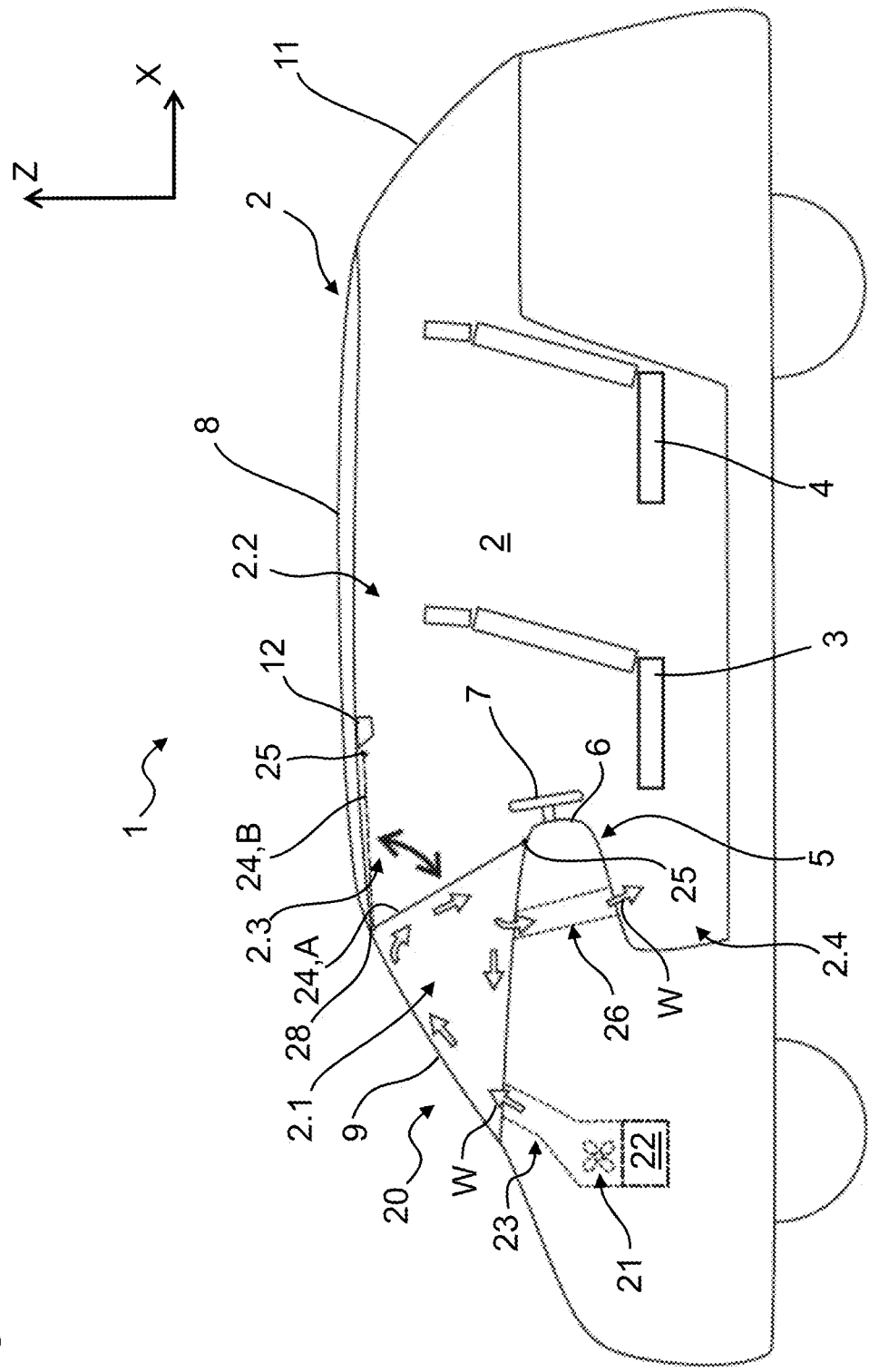
FIG. 3 is a lateral sectioned illustration of a motor vehicle having a second heating system according to one embodiment.

FIG. 3 is a lateral sectioned illustration of a motor vehicle 1 with an alternative embodiment of a heating system 20 according to one embodiment which substantially corresponds to the embodiment illustrated in FIGS. 1 and 2, and which is thus not explained again. In this instance, however, there is arranged on the upper edge 24.1 of the partition unit 24 a hinge 28 via which the hinge unit 24 is pivotably connected to the vehicle roof 8. In the shielding position A, the partition unit 24 is arranged as in FIGS. 1 and 2 and functions in the manner explained. As indicated by the double-headed arrow, the partition unit 24 can be pivoted from the shielding position A into a storage position B in which it is arranged adjacent to the vehicle roof 8. In order to provide sufficient space for the partition unit 24 in the region of the vehicle roof 8, the HUD unit 12 is arranged in this embodiment further back. Of course, the orientation and where applicable the optical elements of the HUD unit 12 are accordingly adapted to ensure a suitable projection into the field of vision of the driver. For reasons of clarity, the beams E, R illustrated in FIG. 1 are omitted in FIG. 3.

It should be noted that the features and measures set out individually in this disclosure can be combined with each other in any technically advantageous manner and set out other embodiments of the disclosure. The description additionally characterizes and specifies the disclosure in particular in connection with the drawing figures.

As a result of the disclosure, a heating system for a windshield of a vehicle is provided. The vehicle may be a road vehicle, in particular a motor vehicle, such as a passenger vehicle or a lorry. In particular, it may be a battery-operated electric vehicle, where applicable also a vehicle with a highly efficient internal combustion engine or a vehicle having a hybrid drive. The disclosure is in particular provided for vehicles in which the drive system produces only small quantities of waste heat. The windshield is generally a screen which is arranged in the travel or movement direction of the vehicle. That is to say, a driver of the vehicle generally requires an unimpeded view through the windshield. The heating system may comprise various components, which either serve actively to heat the windshield or which also to some degree passively support or configure more efficiently, or at least influence the heating of the windshield.

In the vehicle, a fan unit is configured to produce a hot air flow at the inner side of the windshield. The fan unit may be considered to be a part of the heating system. It generally has outlet openings or outlet slots which are arranged on a vehicle inner face, that is to say, on a surface facing the inner side of the vehicle cab. This is generally a surface directly below the windshield, for example, on a front console of the vehicle, from which the hot air flow is directed at least initially upward along the inner side of the windshield. There may of course subsequently be produced an occurrence of turbulence and/or redirection of the hot air flow. It would, however, also be conceivable for at least one outlet opening to be arranged, for example, in an A-pillar or in a front side door and consequently at the side of the windshield. In this instance, the hot air flow could also be directed laterally. The hot air flow may in particular be heated by an electric heating unit, but depending on the vehicle type other heat sources may also be considered, for example, an internal combustion engine of an energy-efficient vehicle, a fuel-operated heating system or the like.

According to one embodiment, the heating system has an at least predominantly transparent partition unit which is secured in a shielding position in the vehicle in such a manner that it is arranged in a longitudinal vehicle direction between at least a predominant portion of the windshield and an inner region which is provided for passengers, whereby the hot air flow can be guided at least partially in a heating region between the windshield and the partition unit. The partition unit may also be referred to as a partition element or at least in some embodiments as a partition wall. It is constructed to be at least predominantly transparent, which includes the possibility that it may comprise at least partially tinted or self-tinting material. Possible materials for the partition unit are, for example, all the materials which are also suitable and permissible for the windshield. In addition, however, a construction from more powerfully flexible materials is also possible, for example, plastics material. The partition unit is preferably constructed to be at least predominantly planar, for example, plate-like, wherein for reasons of saving weight a small material thickness which, however, must ensure a necessary mechanical stability may be preferred.

In the mentioned shielding position, the partition unit is secured in the vehicle, particularly inside the vehicle cab, in such a manner that the partition unit is arranged between the windshield and the inner region provided for the passenger (s). More specifically, it is arranged with respect to the longitudinal vehicle direction (X direction) between at least a predominant portion of the windshield and the inner region. It could also be said that, at least with respect to a predominant portion of the windshield, the partition unit is located in front and shields the inner space to some degree in the X direction away from the windshield or vice versa. A region between the windshield and partition unit, which is referred to below as a heating region, is thereby shielded at least to some degree.

The partition unit is in this instance arranged in such a manner that the hot air flow extends at least partially in this heating region, that is to say, between the windshield and partition unit. It could also be said that the hot air flow can be guided or is guided at least partially in the heating region. This involves in principle the possibility of portions of the hot air flow flowing past the heating region. The portion of the hot air flow which extends in the heating region can move to some degree only between the windshield and the partition unit and is thus "guided." At least an uncontrolled flow into the inner region is consequently prevented. Two effects are thereby achieved. The first effect is that the passengers are subjected, in particular in the head region only to a reduced extent or depending on the embodiment no longer at all, to a hot air flow which is otherwise perceived to be unpleasant. Preferably, the partition unit abuts at least with an upper edge against a vehicle inner face, normally the vehicle roof. In this manner, hot air is prevented from being able to flow upward beyond the partition unit. The second effect is that the hot air flow is concentrated at least temporarily in the heating region. The partition unit prevents or delays a mixing with cooler air from the inner region. As a result, there is at the inner side of the windshield a higher temperature, whereby a defrosting with the same power of the fan unit can be achieved more rapidly and more effectively. Under some circumstances, the partition unit may also lead to additional sound insulation.

Another advantage may arise from the fact that the partition unit which is warm in comparison with a windshield and other outer screens acts as a temperature surface radiator. This is seen in particular in significant to extreme temperatures, for example, between −10° C. and −35° C. As a result of the heat radiation radiated from the partition unit into the inner region, the vehicle passengers perceive the temperature in the inner region to be higher. That is to say, the air temperature in the inner region at which the occupants feel comfortable is lower than without the heat radiation emitted by the partition unit. Energy can thereby be saved again. The overall heat radiation is dependent, on the one hand, on the temperature of the partition unit and, on the other hand, on the surface area with which it radiates in the direction toward the inner region. Since the partition unit according to one embodiment is arranged in the longitudinal vehicle direction between at least a predominant portion of the windshield and the inner region, the surface area mentioned is comparatively large, which has a positive effect on the heat radiation. The comparatively high temperatures of the partition unit leading to the heat radiation can be explained in that the partition unit has no direct contact with the environment of the vehicle and consequently also has no temperature sinks, as is the case with the windshield or other outer windows. Consequently, it can become heated very quickly and can subsequently also be kept warm with a small air flow, which is then naturally even warmer. As a result of the consequently possible reduction of the air flow, the heat losses and consequently the overall required heating power can be further reduced.

The geometric path of the partition unit can be selected differently, wherein of course it should be noted that this may not involve any impairment of the necessary movement space of the passengers. Furthermore, it should be taken into account that the partition unit is necessarily located in the field of vision of the driver, for which reason it should be arranged in such a manner that the probability of irritating reflections, for example, as a result of sunlight, is as low as possible.

In some embodiments, the presence of the partition unit may also have an advantageous effect with respect to the configuration of airbags for the driver and passenger. As long as the partition unit is sufficiently stable and is secured in the vehicle inner space, the partition unit can act as an abutment or abutment face for an airbag being deployed, a function which may be carried out by conventional windshields. However, since the partition unit is arranged closer to the driver or passenger than the windshield, the airbag only has to fill a smaller volume and it can consequently on the whole be constructed to be smaller.

As already mentioned, the partition unit preferably abuts with an upper edge against a vehicle inner face. It is further preferable, in one embodiment, for the partition unit to abut in a vertical vehicle direction and/or in a transverse vehicle direction at both sides against a vehicle inner face. When the partition unit abuts in the vertical vehicle direction at both sides, it thus extends normally from the vehicle roof to the instrument panel or an adjacent inner face of a front console. In this instance, the partition unit does not necessarily have to abut over the entire width at the top or bottom. If the partition unit abuts at both sides in the transverse vehicle direction, it may, for example, extend from an A-pillar to the opposite A-pillar. At locations where the partition unit abuts, it may also be secured, preferably by use of a releasable connection. In particular, the connection may be releasable without tools in order to allow simple assembly and disassembly. This is advantageous because both the separation unit and the inner side of the windshield have to be cleaned from time to time. At each of the edges mentioned, at least partially a gap can also be provided between the separation unit and the adjacent vehicle inner face. If the gap has only a small extent, for example, less than 5 mm or less than 1 mm, this may be negligible under some circumstances.

Since as a result of the fan unit hot air is continuously discharged into the heating region, it is necessary for the air also to be able to leave the heating region again. According to one embodiment, at least one ventilation opening is formed in the partition unit in order to discharge hot air from the heating region into the inner region. The shape, size and number of the ventilation openings are in principle not limited. It is self-evident, however, that above a given total surface area of the ventilation openings, the shielding function of the partition unit is impaired.

In principle, a ventilation opening could to some degree be constructed as a recess within the partition unit. Alternatively or additionally, at least one ventilation opening is constructed at the edge side of the partition unit between the partition unit and an adjacent vehicle inner face. That is to say, the edge or the outer contour of the partition unit is adapted to the inner contour of the vehicle cab in such a manner that at least at one location an intermediate space which forms a ventilation opening is produced.

The at least one ventilation opening may be limited to a lower region of the partition unit in one embodiment. In so far as the partition unit abuts both at the top and at the bottom against a vehicle inner face, in particular all the ventilation openings may be arranged in the lower half or lower third of the partition unit. As a result of this configuration, hot air is prevented from flowing out in the upper region of the partition unit and thus reaching the head region of the passengers.

Advantageously, the outgoing hot air can be used to defrost the side windows of the vehicle or to protect them from misting. This can, for example, be achieved by two ventilation openings being formed in a transverse vehicle direction at both sides of the partition unit in order to direct hot air in the direction toward side windows of the vehicle. The ventilation openings are preferably formed at the edge side and may, for example, as described above, be formed between the partition unit and an adjacent vehicle inner face. Of course, not necessarily only two ventilation openings are possible, but instead also a larger number of ventilation openings which are formed in pairs at both sides, for example, when this is intended to be more effective in the corresponding vehicle for an effective air guiding to the side windows.

Alternatively or additionally to the at least one ventilation opening, at least one air channel may be formed to direct hot air from the heating region into a foot space of the vehicle. Such an air channel is normally formed below the partition unit and may, for example, extend behind the instrument panel and is thus not a part of the partition unit, although it advantageously cooperates therewith in order to achieve a desired flow of the hot air. As a result of the discharge of hot air into the foot space, a temperature layering is supported in which warmer air is present in the foot space and cooler air is present in the upper region. Of course, a plurality of air channels which, for example, could be constructed symmetrically relative to the vehicle center plane may be formed.

In addition to the above-described function thereof for guiding or shielding the hot air flow, the partition unit may optionally also be used for other purposes. According to an advantageous embodiment, the partition unit has a projection face for an HUD unit. Since the partition unit is constructed to be at least predominantly transparent and, as already set out, is arranged at least partially in the field of vision of the driver, it can be readily used for a head-up display (HUD). In this instance, using an imaging unit and an optical module, different types of information can be displayed in the field of vision of the driver. Depending on the inclination of the partition unit, the imaging unit can be arranged either below or above the partition unit. If the partition unit is inclined in a similar manner to the windshield in the direction toward the driver, the imaging unit may be arranged below, in the region of the instrument panel. If the partition unit is inclined away from the driver, the imaging unit may be arranged above, in the region of the vehicle roof. Under some circumstances, the projection face may be used not only for display, but also for input in such a manner that it is determined as a result of suitable, for example, optical sensors, whether one of the occupants touches a specific portion of the projection face. This contact may then be interpreted as an input on an HMI unit (Human Machine Interface).

The geometric path of the partition unit may be used in order together with the HUD unit to influence the projection behavior. For example, the partition unit or at least an inner boundary (facing the inner region) thereof may at least partially have a curvature. This may be a spherical or a non-spherical curvature. Both a convex and a concave curvature are conceivable. In this instance, the curvature may also be non-constant, that is to say, individual regions may be curved to differing extents or individual regions may be curved in a convex manner and others in a concave manner. At the same time, the partition unit may be constructed in a partially planar manner. As a result of the curvature, the partition unit may cooperate as an additional optical imaging element with the HUD unit, for example, in the manner of a concave mirror or a convex mirror. The internal optics of the HUD unit can thereby be configured where applicable in a simpler manner or projections which cannot be achieved only by the internal optics of the HUD unit in combination with a planar partition unit are even possible.

Additionally or alternatively, the two boundaries of the partition unit may extend at least partially (in particular in the region of the projection face) at an angle with respect to each other, that is to say, in a non-parallel manner. It is thereby possible to prevent the occurrence of noticeable dual images which are generally produced when a pane with parallel boundaries is used for projection. Such dual images can also be suppressed by a boundary (normally the inner boundary) having a film or other coating which has highly reflective properties or which reflects the selectively polarized light. When the HUD unit radiates correspondingly polarized light, it may be possible for a reflection which is perceptible for the driver to occur on only one (generally the inner) boundary.

As already mentioned, small gaps and associated leakage flows at the edge side of the partition unit are negligible or acceptable under some circumstances. If this is not desirable, a resilient seal may advantageously be arranged at the edge side of the partition unit in order to produce an air-tight connection to an adjacent vehicle inner face. The corresponding resilient seal normally forms in this instance a portion of the partition unit. The seal may be formed predominantly or even completely circumferentially along the edge of the partition unit. It is possible to use, for example, silicone or rubber, in particular in foamed form as foam rubber or sponge rubber as materials.

According to one embodiment, the partition unit is configured to be arranged in a storage position on a vehicle roof. The storage position differs from the above-described shielding position. That is to say, when the partition unit is arranged in the storage position, the partition unit cannot perform the described partition function. Under some circumstances, however, for example, in warm temperatures, when a heating of the windshield is not required, it may be advantageous for the partition unit not to be located between the driver and the windshield. For example, cleaning of the windshield is readily possible. The change between the shielding position and the storage position may, for example, be carried out by use of a pivot movement in the manner of a sun visor. That is to say, the partition unit may at an upper edge be pivotably connected to the vehicle roof.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A heating system for a windshield of a vehicle, comprising:
    a fan unit configured to produce a hot air flow at an inner side of the windshield;
    an at least predominantly transparent partition unit which, in a shielding position, is secured in the vehicle in a manner arranged in a longitudinal vehicle direction between at least a predominant portion of the windshield and an inner region provided for passengers, whereby the hot air flow is guided at least partially in a heating region between the windshield and the partition unit, and wherein the partition unit in the shielding position is angled vehicle rearward extending straight from a top edge abutting a roof of the vehicle or an upper edge of the windshield to a bottom edge of the transparent unit such that the transparent unit extends away from the windshield; and
    at least one air channel formed in a console of the vehicle to direct hot air from the heating region, through the at least one air channel, into a foot space of the vehicle.

2. The heating system as claimed in claim 1, wherein the partition unit abuts at least one of a vertical vehicle direction and a transverse vehicle direction at both sides against a vehicle inner face.

3. The heating system as claimed in claim 1 further comprising at least one ventilation opening formed between the partition unit and a vehicle interior to discharge hot air from the heating region into the inner region, and wherein the hot air flow enters the heating region via and additional channel in the console.

4. The heating system as claimed in claim 3, wherein the at least one ventilation opening is constructed at an edge side of the partition unit between the partition unit and an adjacent vehicle inner face.

5. The heating system as claimed in claim 4, wherein the at least one ventilation opening is limited to a lower region of the partition unit.

6. The heating system as claimed in claim 3, wherein the at least one ventilation opening comprises two ventilation openings formed in a transverse vehicle direction at both sides of the partition unit to direct hot air in a direction toward side windows of the vehicle.

7. The heating system as claimed in claim 1, wherein the partition unit has a projection face for an HUD unit.

8. The heating system as claimed in claim 1 further comprising at least one resilient seal arranged at an edge side of the partition unit in order to produce an air-tight connection to an adjacent vehicle inner face.

9. The heating system as claimed in claim 1, wherein the partition unit is configured to be arranged in a storage position below a vehicle roof.

10. A heating system for a windshield of a vehicle, comprising:
    a fan unit producing a hot air flow at an inner side of the windshield;
    a predominantly transparent partition unit which, in a shielding position, is secured in the vehicle between at least a predominant portion of the windshield and an inner region which is provided for passengers, whereby the hot air flow is guided at least partially in a heating region between the windshield and the partition unit, and wherein the partition unit in the shielding position is angled vehicle rearward extending straight from a top edge abutting a roof of the vehicle or an upper edge of the windshield to a bottom edge of the transparent unit such that the transparent unit extends away from the windshield; and at least one air channel formed in a console of the vehicle to direct hot air from the heating region, through the at least one channel, into a foot space of the vehicle.

11. The heating system as claimed in claim 10, wherein the partition unit abuts in at least one of a vertical vehicle direction and a transverse vehicle direction at both sides against a vehicle inner face.

12. The heating system as claimed in claim 10 further comprising at least one ventilation opening formed between the partition unit and a vehicle interior to discharge hot air from the heating region into the inner region, and wherein the hot air flow enters the heating region via an additional channel.

13. The heating system as claimed in claim 12, wherein the at least one ventilation opening is constructed at an edge side of the partition unit between the partition unit and an adjacent vehicle inner face.

14. The heating system as claimed in claim 13, wherein the at least one ventilation opening is limited to a lower region of the partition unit.

15. The heating system as claimed in claim 12, wherein the at least one ventilation opening comprises two ventilation openings formed in a transverse vehicle direction at both sides of the partition unit to direct hot air in a direction toward side windows of the vehicle.

16. The heating system as claimed in claim 10, wherein the partition unit has a projection face for an HUD unit.

17. The heating system as claimed in claim 10 further comprising at least one resilient seal arranged at an edge side of the partition unit in order to produce an air-tight connection to an adjacent vehicle inner face.

18. The heating system as claimed in claim 10, wherein the partition unit is configured to be arranged in a storage position below a vehicle roof.

* * * * *